United States Patent Office 3,363,542
Patented Jan. 16, 1968

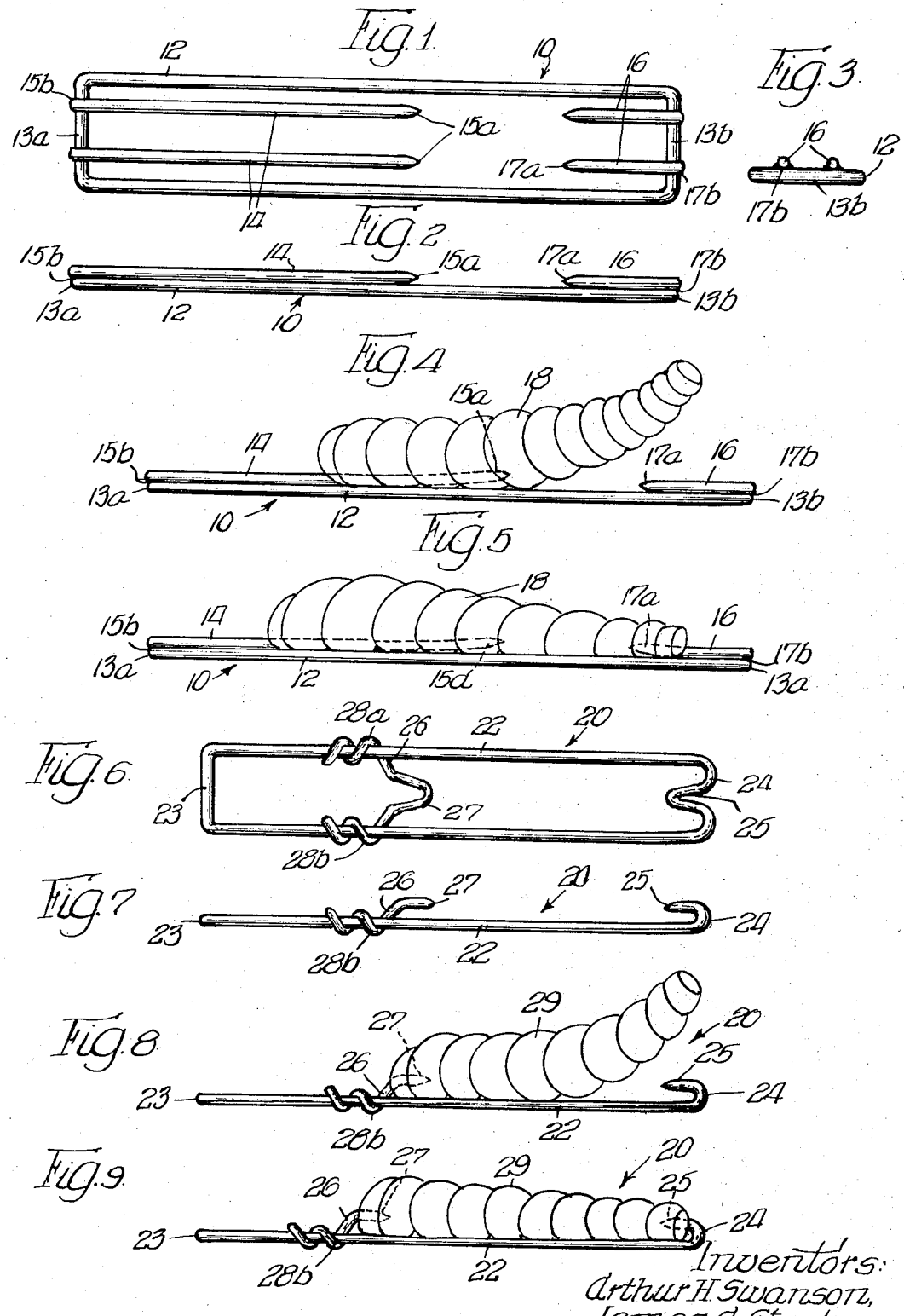

3,363,542
COOKING UTENSIL
Arthur H. Swanson, Box 76, and James A. Stark, 69 Rose Place, both of Clarendon Hills, Ill. 60514
Filed June 22, 1966, Ser. No. 559,564
3 Claims. (Cl. 99—419)

ABSTRACT OF THE DISCLOSURE

A rack for holding lobster tails and large shrimp in a straightened attitude for preparing, cooking and serving. A rectangular wire rack is provided with inwardly projecting tines at each of the short ends of the rectangle for insertion between the shell and flesh of the lobster tail or large shrimp.

---

This invention relates to utensils for food and, more particularly, to a utensil construction capable of maintaining an item of food in a straightened position for preparation, cooking and serving.

It is common knowledge that certain foods, and particularly those having a heavy outer shell or skin such as lobster tails, shrimp and the like, have a tendency to curl or otherwise deform from a straightened attitude during cooking. This fact presents an especial problem in connection with the broiling or boiling of lobster tails and large shrimp. For example, when a lobster tail is broiled, it has a tendency to curl and turn on its side, thus making it difficult to achieve uniform cooking and a pleasingly consistent state of browning. Such items are also inconvenient to eat, especially from the shell and particularly when served very hot, unless they can be maintained in a flat or straightened position. In addition, certain lobster tails, shrimp and other types of food, as for example some hard sausages, are normally in a curved or curled attitude even before cooking. They are therefore difficult to dress and prepare for cooking, and the cooking itself often accentuates the curled conformation.

According, the principal object of this invention lies in the provision of a utensil capable of holding and maintaining a food item in a straightened position for preparation, cooking and serving.

A further object of this invention is the provision of a rack for cooking and serving a food item which is subject to curling or other deformation during cooking.

Still another object of this invention is the provision of a rack for preparing, cooking and serving a food item which is normally in a curled or curved attitude prior to cooking.

It is a specific object of this invention to provide a rack capable of holding a food item in a straightened position for preparation, cooking and serving, which rack is extremely simple in construction and easily fabricated from low-cost and lightweight yet strong and durable material, such as steel or aluminum wire.

Another specific object of this invention is to provide a rack capable of holding a lobster tail or shrimp in a straightened attitude for preparing, cooking and serving.

A fuller understanding and appreciation of the foregoing objects as well as others will be derived from a consideration of the specification and claims, with reference to the drawing, in which latter:

FIGURE 1 is a plan view of a preferred construction embodying the invention;

FIGURE 2 is a side elevational view of the construction depicted in FIGURE 1;

FIGURE 3 is an end elevational view of the construction depicted in FIGURE 1;

FIGURE 4 is a side view of the construction of FIGURE 1, showing a food item partially in position thereon;

FIGURE 5 is a view similar to that in FIGURE 4, but showing the food item in final position;

FIGURE 6 is a plan view of another preferred construction embodying the invention;

FIGURE 7 is a side elevational view of the construction shown in FIGURE 6;

FIGURE 8 is a view similar to that in FIGURE 7, showing a food item partially in position; and FIGURE 9 is a view like that in FIGURE 8, but showing the food item in final position.

In general, the invention is directed to a rack capable of holding and maintaining an item of food in a straightened position during preparation, cooking and eating. One preferred construction which embodies the invention employs a frame having a plurality of opposed tines. The food item is empaled on one set of such tines, and is then positioned so that it can be empaled on the remaining set of tines in a flattened or straightened attitude. The tines, while having a certain resiliency, are sufficiently resistant to deformation that their cooperative effect retains the food item in proper position. Another preferred construction which embodies the invention utilizes a similar frame, but without tines. In this latter construction, the frame has a hook attached at one end, and a second hook adapted to slide up and down the length of the frame. One end of the food item is secured under the slideable hook, and the food item can then be positioned so that its other end is secured by the fixed hook. The two hooks thus cooperate to maintain the food item in a flattened or straightened position. Both of the foregoing constructions are capable of holding food items of varying sizes.

With specific reference to the drawing, FIGURES 1, 2 and 3 depict one preferred form of rack construction, generally denoted by the numeral 10, which embodies the present invention. The illustrated rack 10 has as its principal structural element a frame 12, which, as shown, has a generally elongated rectangular configuration. A pair of tines 14, having pointed or sharpened ends 15a, are attached at their unpointed ends 15b to an end 13a of the frame 12, and extend in substantially parallel relationship to the sides of the frame into the area defined by the frame. In similar fashion, a second pair of tines 16, having pointed or sharpened ends 17a, are attached at their unpointed ends 17b to the other end 13b of the frame 12, and extend in substantially parallel relationship to the sides of the frame into the area defined by the frame. It will be noted that the tines 16 are somewhat shorter than the tines 14. This feature, as will become apparent below, is designed to permit ready introduction of the food item onto the rack, and is capable of numerous modifications regarding the relative length of the tines, etc. All that is crucial is to allow sufficient space for easy introduction of the food item.

The frame 12 and tines 14 and 16 may be fabricated from readily available and easily shaped materials such as stainless steel wire or aluminum wire or the like. These materials are preferable since they are relatively resistant to corrosion and are easily cleaned. Moreover, such materials are highly suitable for use in the relatively high-temperature environments normally encountered in cooking foods. The tines 14 and 16 may be secured to the ends 13a and 13b of the frame 12 by welding or other suitable methods.

The operation of the rack construction depicted in FIGURES 1, 2 and 3 can now be described. With specific reference to FIGURES 4 and 5, the numeral 18 denotes an item of food to be placed upon the rack 10. As shown therein, the food item 18 can be taken to represent a lobster tail or large shrimp with shell intact. Such foods are often in a curled attitude prior to cooking, and the cooking accentuates this deformation. Accordingly, the rack 10 is particularly suitable for maintaining a lobster tail or shrimp in a straightened position. It should be understood, however, that the rack 10 is capable of use with other types of food as well.

As shown in FIGURE 4, one end of the lobster tail or shrimp 18 is empaled upon the sharpened ends 15a of the tines 14, just under the shell, and is then moved toward the end 13a of the frame 12, driving the tines deeper into the flesh, until the other end of the lobster tail or shrimp 18 clears the sharpened ends 17a of the tines 16. As can be seen from FIGURE 5, the lobster tail or shrimp 18 is then moved in the opposite direction, toward the end 13b of the frame 12, so that the other end of the lobster tail or shrimp 18 is empaled on the sharpened ends 17a of the tines 16. The lobster tail or shrimp 18 is thereby retained in a flattened or straightened attitude by the cooperative action of the tines 14 and 16.

It should be understood that the rack 10 may be made in varying widths, with varying numbers of tines, so as to accommodate any reasonable number of food items. In addition, the rack need not have a rectangular frame, but could be fabricated in other shapes; as for example, the frame 12 could be circular or oval, with tines attached all around the periphery and extending into the area defined by the frame. The rack construction illustrated in FIGURES 1 through 5 is merely preferable as being particularly well-suited for holding a single item of food such as a lobster tail or shrimp.

Another preferred form of rack construction which embodies the present invention is depicted in FIGURES 6 through 9. As shown therein, the rack, which is generally denoted by the numeral 20, has as its principal structural element a frame 22 having a generally elongated rectangular configuration. One end 24 of the frame 22 is bent up and back and is nipped so as to form a fixed tab or hook 25.

An element 26, preferably fabricated from the same type of materials as the frame 22, is slideably attached to the sides of the frame by means of helically wrapped legs 28a and 28b. A portion of the element 26 is shaped to form a moveable tab or hook 27.

The operation of the rack 20 can be understood by reference to FIGURES 8 and 9. As shown therein, one end of a food item 29, as for example a lobster tail or shrimp, is secured under the moveable hook 27. In the case of a lobster tail or shrimp 29, the edge of the shell is inserted under the moveable hook 27. Since the element 26 is slideably attached to the frame 22, the lobster tail or shrimp 29 can then be moved towards the other end 23 of the frame until the free end of the lobster tail or shrimp clears the fixed hook 25. The free end of the lobster tail or shrimp 29 is then secured under the fixed hook 25. As shown in FIGURE 9, the lobster tail or shrimp 29 is thus retained in a flattened or straightened position by the cooperative action of the fixed hook 25 and the moveable hook 27.

It is apparent from the foregoing that the rack 20 can accommodate a wide range of sizes of food items, since the element 26 is slideable to adjust for variations in length and to permit easy insertion of the food item. As in the case of the construction shown in FIGURES 1 through 5, the rack 20 can be fabricated from readily available materials such as stainless steel wire or aluminum wire or the like.

Although the invention has been described with the requisite particularity, the disclosure is of course only exemplary. Consequently, numerous changes in the details of construction and the size and configuration of components will be apparent to those familiar with the art, and may be resorted to without departing from the scope of the invention as set forth in the following claims.

We claim:

1. A rack for holding lobster tails or shrimp in a straightened attitude, said rack being fabricated from resilient wire and comprising a frame having a pair of substantially parallel frame ends and a pair of substantially parallel frame sides arranged so as to define a generally rectangular area, a first set of sharpened tines attached to one of said frame ends and projecting into said rectangular area, and a second set of sharpened tines attached to the other of said frame ends and projecting substantially farther into said rectangular area than said first set; the diameter of said tines being sufficiently small to permit ready insertion thereof beneath the shell of the lobster tail or shrimp; each individual tine in said first set of tines being essentially axially aligned with a corresponding opposing tine in said second set of tines; the total length of any two opposing tines being less than the length of one of said frame sides so that there is sufficient distance between the sharpened ends of said two opposing tines to permit one end of the lobster tail or shrimp to be empaled upon one of said opposing tines and the other end of the lobster tail or shrimp to be empaled upon the other of said opposing tines.

2. A rack acording to claim 1, wherein said first set of tines consists of two tines, said second set of tines consists of two lines, and said rectangular area is of approximate size to contain a single lobster tail or shrimp.

3. A rack for holding a food item in a straightened attitude, said rack being fabricated from resilient wire and comprising a frame having a pair of substantially parallel frame ends and a pair of substantially parallel frame sides arranged so as to define a generally rectangular area, a first set of sharpened tines attached to one of said frame ends and projecting into said rectangular area, and a second set of sharpened tines attached to the other of said frame ends and projecting substantially farther into said rectangular area than said first set; each individual tine in said first set of tines being essentially axially aligned with a corresponding opposing tine in said second set of tines; the total length of any two opposing tines being less than the length of one of said frame sides so that there is sufficient distance between the sharpened ends of said two opposing tines to permit one end of said food item to be empaled upon one of said opposing tines and the other end of said food item to be impaled upon the other of said opposing tines.

References Cited

UNITED STATES PATENTS

| | | | |
|---|---|---|---|
| 155,789 | 10/1874 | Camp | 99—421 |
| 363,519 | 5/1887 | Houston | 99—419 |
| 1,568,535 | 1/1926 | Schey | 99—421 |
| 3,056,621 | 10/1962 | Edridge | 294—5.5 |
| 2,479,533 | 8/1949 | Woodbury | 99—441 X |
| 2,684,625 | 7/1954 | Trunk | 99—441 |

FOREIGN PATENTS

| | | |
|---|---|---|
| 212,058 | 3/1924 | Great Britain. |

WILLIAM I. PRICE, *Primary Examiner.*

J. M. NEARY, *Assistant Examiner.*